(12) United States Patent
Dalmia et al.

(10) Patent No.: US 10,382,519 B2
(45) Date of Patent: Aug. 13, 2019

(54) UTILIZING BACK OFFICE SERVICES OF A WAGERING GAME MACHINE

(71) Applicant: Bally Gaming, Inc., Las Vegas, NV (US)

(72) Inventors: Mili Dalmia, Bangalore (IN); Jaganmohan Reddy Sirasanambeti, Bangalore (IN); Sunil Somanna Subramani, Bangalore (IN)

(73) Assignee: Bally Gaming, Inc., Las Vegas, NV (US)

( * ) Notice: Subject to any disclaimer, the term of this patent is extended or adjusted under 35 U.S.C. 154(b) by 178 days.

(21) Appl. No.: 15/491,570

(22) Filed: Apr. 19, 2017

(65) Prior Publication Data

US 2018/0309816 A1    Oct. 25, 2018

(51) Int. Cl.
| | |
|---|---|
| *G06F 15/173* | (2006.01) |
| *H04L 29/08* | (2006.01) |
| *G06Q 20/28* | (2012.01) |
| *G07F 17/34* | (2006.01) |
| *G07F 17/32* | (2006.01) |

(52) U.S. Cl.
CPC ............ *H04L 67/02* (2013.01); *G06Q 20/28* (2013.01); *G07F 17/329* (2013.01); *G07F 17/3213* (2013.01); *G07F 17/3216* (2013.01); *G07F 17/3218* (2013.01); *G07F 17/3223* (2013.01); *G07F 17/3227* (2013.01); *G07F 17/3232* (2013.01); *G07F 17/3234* (2013.01); *G07F 17/3241* (2013.01); *G07F 17/3246* (2013.01); *G07F 17/3248* (2013.01); *G07F 17/3251* (2013.01); *G07F 17/3288* (2013.01); *G07F 17/3293* (2013.01); *G07F 17/34* (2013.01)

(58) Field of Classification Search
CPC .............. H04L 67/02; G06F 17/30861; G07F 17/3216; G07F 17/3223; G07F 17/3227; G07F 17/3234; G07F 17/3241
USPC ........................................ 709/219, 217, 224
See application file for complete search history.

(56) References Cited

U.S. PATENT DOCUMENTS

| | | | |
|---|---|---|---|
| 8,690,682 B1 * | 4/2014 | Frattinger | G07F 17/323 463/16 |
| 8,845,433 B2 | 9/2014 | Nelson et al. | |
| 2008/0274795 A1 * | 11/2008 | Carpenter | G07F 17/32 463/25 |

(Continued)

*Primary Examiner* — Philip B Tran
(74) *Attorney, Agent, or Firm* — Grant A. Dingledine

(57) ABSTRACT

A method can include receiving, by bindings of the wagering game machine via Hyper Text Transfer Protocol (HTTP), a first message including information for accessing a back office service of the wagering game machine; identifying, by an adapter of the wagering game machine, the back office service based on the information; generating, by the adapter, a back office service request; providing, by the adapter, the back office service request to a back office service controller; performing, by the back office service controller, the back office service; generating, by the back office service controller, information related to performance of the back office service; receiving, by the adapter from the back office service controller, a second message including the information related to performance of the back office service; transmitting, via the bindings, the second message to the remote computing device over a network via the HTTP protocol.

15 Claims, 13 Drawing Sheets

(56) References Cited

U.S. PATENT DOCUMENTS

| | | | | |
|---|---|---|---|---|
| 2010/0075751 A1* | 3/2010 | Garvey | ................. | G06Q 10/06 463/30 |
| 2010/0203961 A1* | 8/2010 | Burke | .................... | G07F 17/32 463/29 |
| 2013/0324237 A1* | 12/2013 | Adiraju | ............... | G07F 17/3225 463/29 |
| 2014/0370970 A1* | 12/2014 | Adiraju | ............... | G07F 17/3234 463/25 |

* cited by examiner

UTILIZING BACK OFFICE SERVICES OF A WAGERING GAME MACHINE

LIMITED COPYRIGHT WAIVER

A portion of the disclosure of this patent document contains material which is subject to copyright protection. The copyright owner has no objection to the facsimile reproduction of the patent disclosure, as it appears in the Patent and Trademark Office patent files or records, but otherwise reserves all copyright rights whatsoever. Copyright 2017, Bally Gaming, Inc.

FIELD

Embodiments of the inventive subject matter relate generally to wagering game systems, and more particularly to providing remote access to back office services of wagering game machines.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator.

Operating and maintaining wagering game machines can be a laborious task. Many casino operators employ floor attendants who assist players in playing and using wagering game machines. Floor attendants may explain game features, resolve player disputes, assist with cash-out, and more. Floor attendants may call machine technicians to evaluate malfunctions and anomalies. As a result, there is relatively high interest in tools related to operating and maintaining wagering game machines.

BRIEF DESCRIPTION OF THE FIGURES

Embodiments of the invention are illustrated in the Figures of the accompanying drawings in which.

DESCRIPTION OF THE EMBODIMENTS

Introduction

Figure 1:
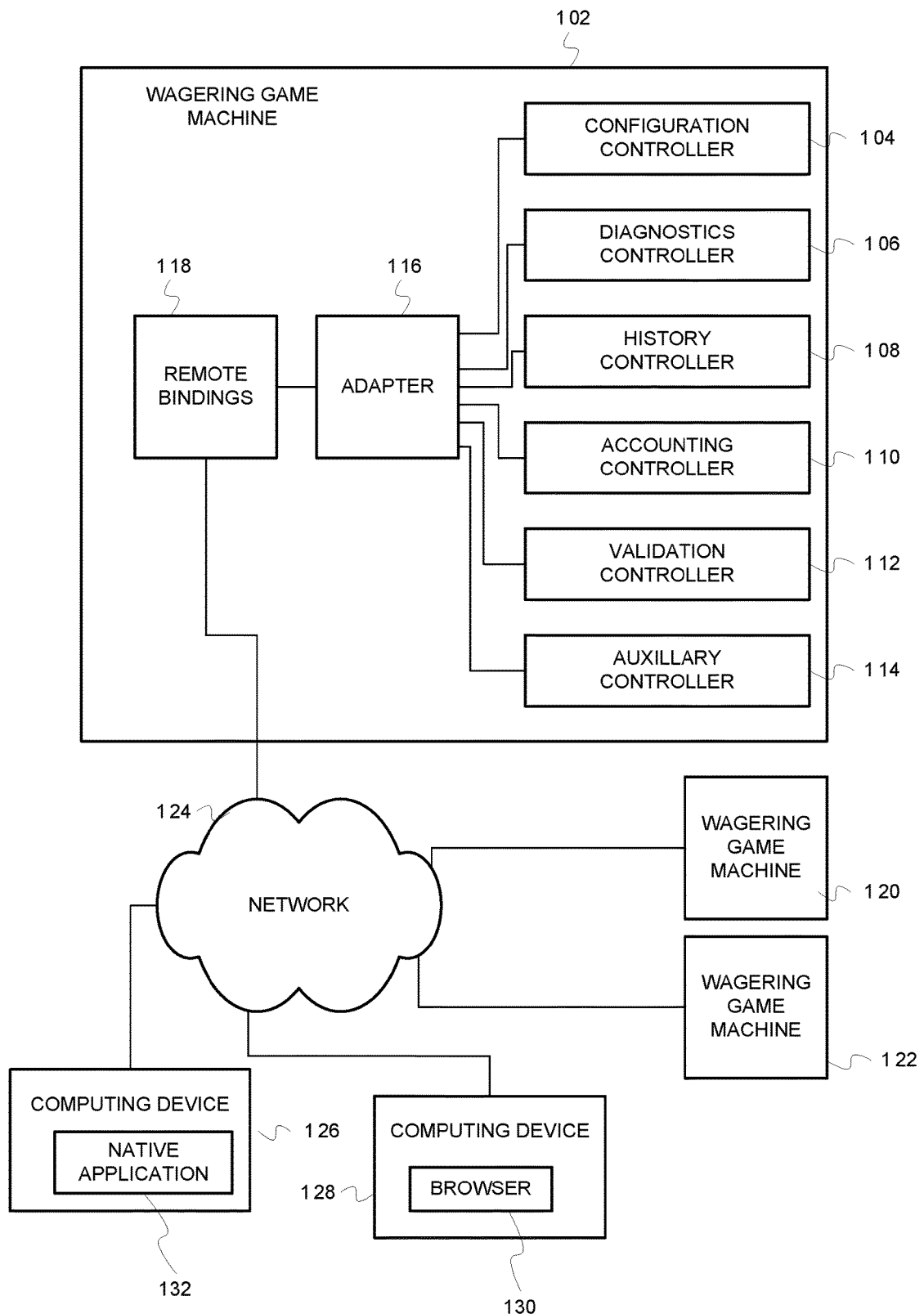
FIG. 1 is a block diagram illustrating wagering game machines and computing devices, according to some embodiments of the inventive subject matter.

This section provides an introduction to some embodiments of the invention.

Wagering game machines typically offer "back office" functionality, such as functionality for configuring the wagering game machines, diagnosing machine problems, viewing machine game histories, accessing machine accounting information, etc. In the past, back office functionality was only available to technicians who could physically access the wagering game machines. In some instances, technicians had to open machine cabinets to utilize back office functionality, such as game history functionality for resolving disputes about game results. Some embodiments of the inventive subject matter enable wagering game machines to expose their back office functionality to remote network devices. According to some embodiments, a mobile device can remotely access a wagering game machine's complete back office functionality over a network. Hence, some embodiments eliminate a need to be physically present to access a machine's back office functionality. As an example, some embodiments enable technicians to address player disputes without opening a machine cabinet and without interrupting game play. Some embodiments enable a technician to view a machine's game history on a remote mobile device and resolve the dispute remote from the wagering game machine. As another example, some embodiments enable technicians to remotely access back office diagnostic functionality to remotely diagnose various technical problems, such as component failures, software issues, and other problems not reported by standard wagering game machine protocols.

In some embodiments, wagering game machines process back office requests using Hypertext Markup Language (HTML) pages sent over Hypertext Transfer Protocol (HTTP). For example, a remote device's browser may request a machine's back office functionality using HTTP requests sent over web sockets and TCP/IP. The wagering game machine can receive and process the HTTP requests. In turn, the machine can provide back office functionality by providing HTML pages via HTTP. The remote device may utilize a native application (e.g., an iOS® application running on an Apple® iPad®) or a browser to access the machine's back office functionality. In any case, remote devices and wagering game machines utilize HTTP and HTML pages to facilitate back office functionality.

Although some embodiments relate to remote devices, other embodiments utilize HTTP to facilitate local use of back office functionality. That is, a browser on the wagering game machine can access the machine's locally hosted back office services using HTTP. For security reasons, some wagering game machines may not allow remote access. These machines may nevertheless utilize HTTP and HTML pages to provide back office functionality to technicians physically present at the machines. In some embodiments, wagering game machines include browsers that enable technicians to access local back office functionality.

These and other embodiments are described in greater detail below.

Components

This section describes example components used with some embodiments. This section includes discussion about computing devices, wagering game machines, and techniques by which these devices facilitate remote access to back office services on wagering game machines.

FIG. 1 is a block diagram illustrating wagering game machines and computing devices, according to some embodiments of the inventive subject matter. In FIG. 1, wagering game machine 102 includes remote bindings 118, adapter 116, and components for providing back office functionality.

The adapter 116 operates as a mediator between remote devices and the machine's back office service controllers. In some embodiments, the adapter 116 receives information from remote devices and creates messages in formats understood by one or more back office service controllers. The adapter 116 can also receive information from back office service controllers and create messages understood by remote devices.

The back office components include a configuration controller 104, diagnostics controller 106, history controller 108, accounting controller 110, validation controller 112, and an auxiliary controller 114. The configuration controller 104 can manage all configuration aspects of the wagering gaming machine. For example, the configuration controller can manage game configuration for theme, pay table, denomination, protocols, etc. The configuration controller 104 can control the machine's initial configuration and reconfiguration after initial configuration. The diagnostics controller can control all diagnostic aspects of the gaming machine. For example the diagnostics controller 106 can control diagnostics related to peripherals (e.g., bill validator, printer, etc.), CPUs, memory, protocol communication status, protocol messages etc. The validation controller 112 determines digital signatures of installed software modules and can compare them against stored digital signatures. The accounting controller 110 can make available all master and period meters. The auxiliary controller 114 provides additional back office services and can be configured to provide later developed services.

The wagering game machine 102 can communicate with computing devices 126 and 128 over a network 124. The network 124 can include any suitable wired and wireless technologies. The computing device 126 includes a native application 132. The computing device 128 includes a browser 130. Wagering game machines 120 and 122 are connected to the network 124. Although connections to the network 124 are illustrated using solid lines, each of the connections can be wired or wireless.

The remote bindings 118 can include functionality for implementing communications with the computing devices 126 & 128 and any other network devices. The remote bindings 118 can include computer executable instructions or hardware components for implementing the internet protocol stack. In some embodiments, the remote bindings 118 enable communications via one or more of Standard Object Access Protocol, Representational State Transfer (REST) protocol, Hyper Text Transport Protocol (HTTP), Websocket protocol, other transport layer protocols (e.g., Transmission Control Protocol), internet layer (e.g., Internet Protocol), and link layer protocols (e.g., WiFi, Ethernet, DSL, etc.). The remote bindings 118 may include information defining how protocols interact with each other, such as how SOAP interacts with HTTP and other protocols. As a result, the remote bindings 118 enable the wagering game machine 102 to provide back office functionality as a set of web services callable by the remote computing devices 126 and 128. In some embodiments, the remote bindings 118 uses HTTPS, which is HTTP over a connection encrypted by Transport Layer Security protocol or Secure Socket Layer protocol.

The computing device 128 can use the browser 130 (e.g., Chrome browser, Internet Explorer browser, Firefox browser, etc.) to access back office functionality hosted by the wagering game machine 102. For example, the browser 130 may be configured with a uniform resource locator (URL) for accessing web services provided by the wagering game machine's back office components (e.g., configuration controller 104, diagnostics controller 106, etc.). The browser 130 can use the URL to request and receive an initial web page from the machine 102. The browser 130 can present web pages on a display device (not shown). The initial web page may provide additional URLs that enable the browser 130 to access any of the back office services available on the wagering game machine 102. The browser 130 can communicate with the wagering game machine's remote bindings 118 using protocols defined in the standard internet protocol stack, such as SOAP or REST, HTTP or Web Socket, and TCP/IP. Because the wagering game machine 102 has implemented back office functionality as web services, technicians can use the browser 130 to remotely access the machine's configuration controller 104, diagnostics controller 106, etc.

The computing device 126 includes the native application 132. Although not shown, the computing device includes an operating system (e.g., iOS), and the native application 132 is coded in one or more programming languages (e.g., JavaScript) specifically for operation with that operating system (e.g., iOS operating system). The native application 132 includes components that access the back office functionality on the wagering game machine 102. As noted, the wagering game machine 102 offers the back office functionality as web services. The native application 132 can use standard internet protocols to receive information from the web services (i.e., the back office functionality). The native application 132 can present the information using its own user interface functionality. This differs from the browser 130 (of device 128) which renders HTML pages that define the browser's interface.

Figure 2:
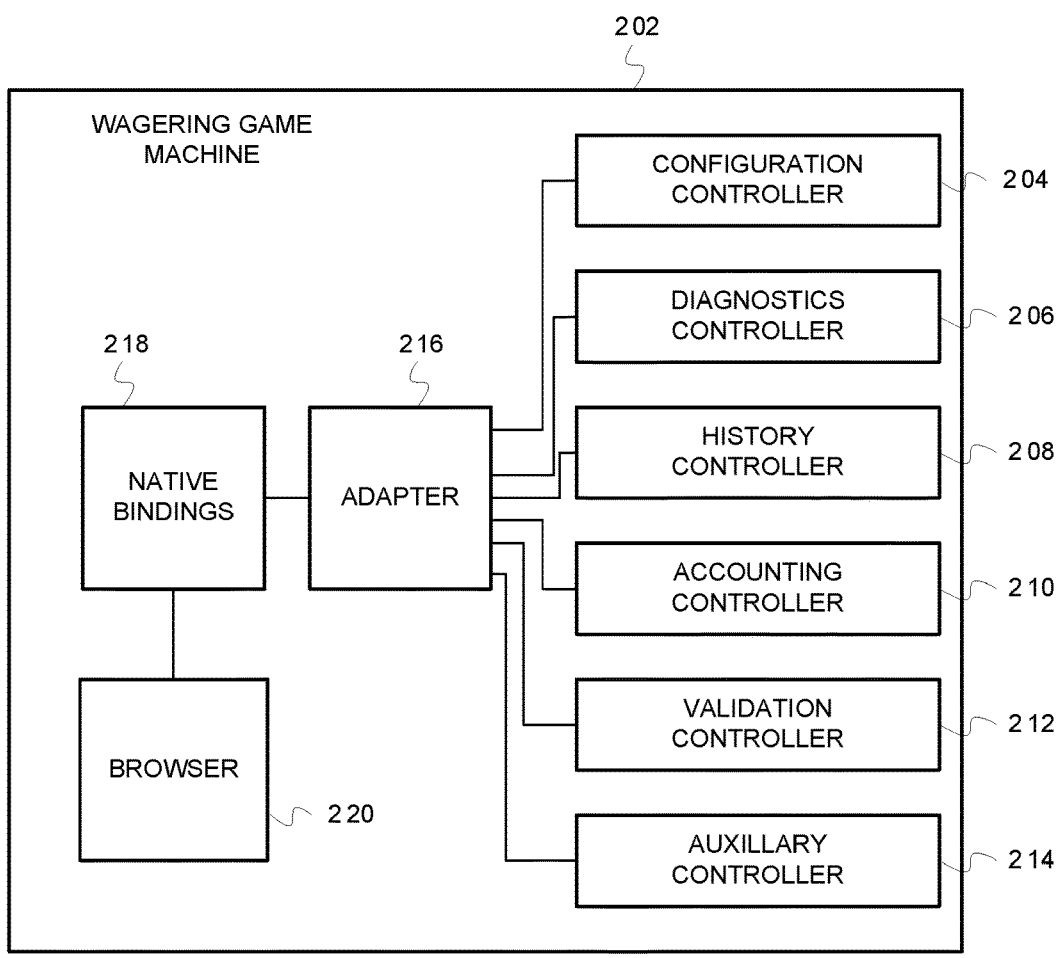
FIG. 2 is a block diagram illustrating a wagering game machine configured to locally provide back office services using internet protocols, according to some embodiments.

FIG. 2 is a block diagram illustrating a wagering game machine configured to locally provide back office services using internet protocols, according to some embodiments. In FIG. 2, wagering game machine 202 includes a browser 220, native bindings 218, adapter 216, and components for providing back office functionality. The back office components include a configuration controller 204, diagnostics controller 206, history controller 208, accounting controller 210, validation controller 212, and an auxiliary controller 214. The controllers in FIG. 2 perform operations like those described vis-à-vis FIG. 1.

The adapter 216 operates as a mediator between remote devices and the back office service controllers. In some embodiments, the adapter 216 receives information from remote devices and creates messages in formats understood by one or more back office service controllers. The adapter 216 can also receive information from back office service controllers and create messages understood by remote devices.

The native bindings 218 include program instructions for implementing the internet protocol stack. However, the native bindings 218 are not accessible to remote devices. Instead of providing back office web services to remote devices, the native bindings 218 facilitate web services to the browser 220. In some embodiments, the native bindings 218 operate as a private web server that receives HTTP requests from the browser 220 and provides HTML files (i.e., web pages) to the browser 220. The HTML files include information provided by the back office components including the configuration controller 204, diagnostics controller 206, etc. Such provision of back office information constitutes provision of back office services to the local browser 220.

As noted, the native bindings 218 are configured to enable back office services as local web services presented on the browser 220. In some embodiments, technicians can modify the native bindings 218 to operate as remote bindings (described above). Such modification may entail enabling access to external networks, such as by enabling network interface components, enabling specific ports to service network traffic, and enabling other suitable communication functionality.

Figure 3:
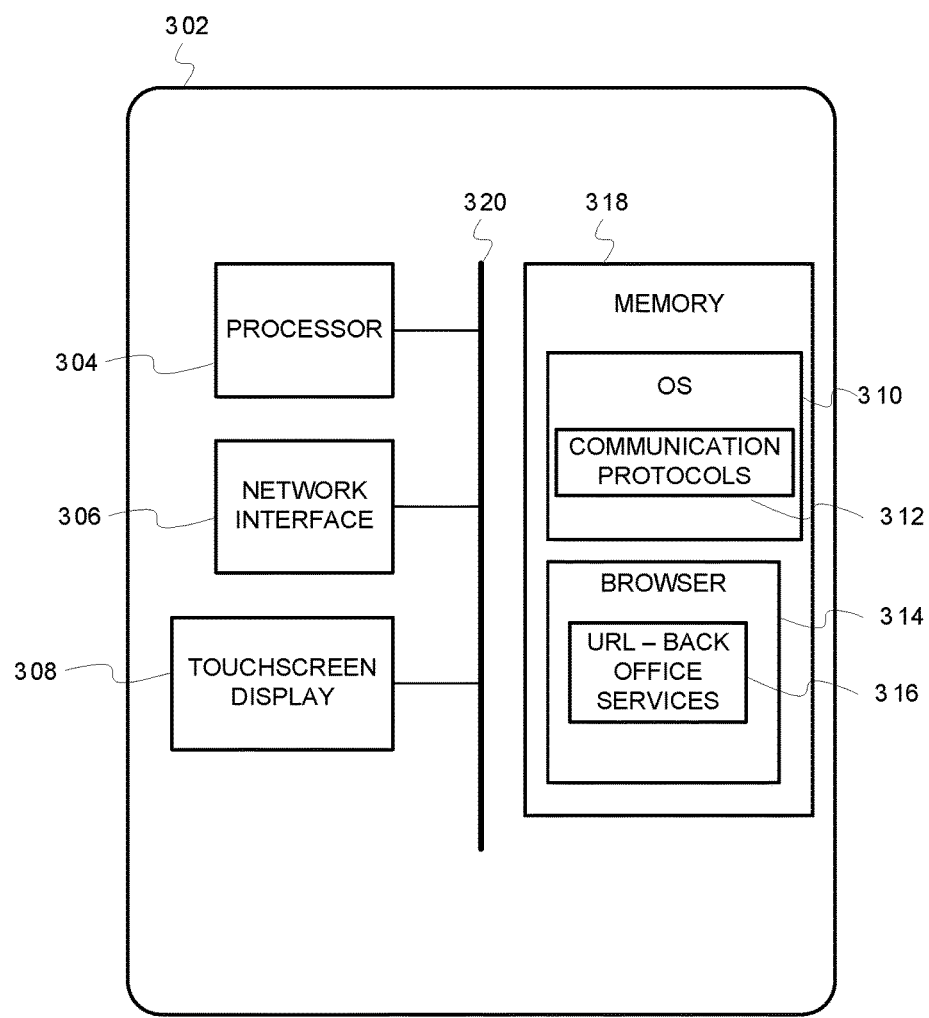
FIG. 3 is a block diagram illustrating a computing device including a browser, according to some embodiments.

FIG. 3 is a block diagram illustrating a computing device including a browser, according to some embodiments. In FIG. 3, a computing device 302 includes a bus 320 connected to a processor 304, network interface 306, and touchscreen display 308, and memory 318. The memory 318 includes an operating system 310 and browser 314. The computing device 302 can be any suitable mobile device, such as a tablet computer (e.g., iPad, Galaxy Tab, etc.), laptop computer, smart phone, etc.

The operating system 310 can be any suitable operating system, such as iOS, Windows®, Linux, Android™, etc. The operating system 310 includes communication protocols 312 that facilitate remote communications between the browser 314 and wagering game machines. The communication protocols 312 can include protocols from the Internet protocol suite (e.g., TCP, IP, etc.) and protocols from the OSI stack (e.g., Ethernet, WiFi, etc.). The browser 314 is capable requesting, receiving, and rendering information (e.g., HTML documents) received from remote web servers and web services (e.g., back office services). In some implementations, the browser 314 utilizes SOAP or REST and HTTP to access back office functionality as web services hosted on a wagering game machine. In some embodiments, the browser 314 includes any suitable off-the-shelf browser (e.g., Chrome, Internet Explorer, Firefox, etc.) configured with one or more URLs for accessing back office functionality as web services. In some embodiments, for security purposes, the browser does not show the URL to users. In some embodiments, the URL requests web pages that facilitate an authentication process that must be completed before a wagering game machine exposes back office functionality. The back office functionality may be available as web services or as a website. In any case, the browser 314 can present content associated with the back office functionality.

Figure 4:
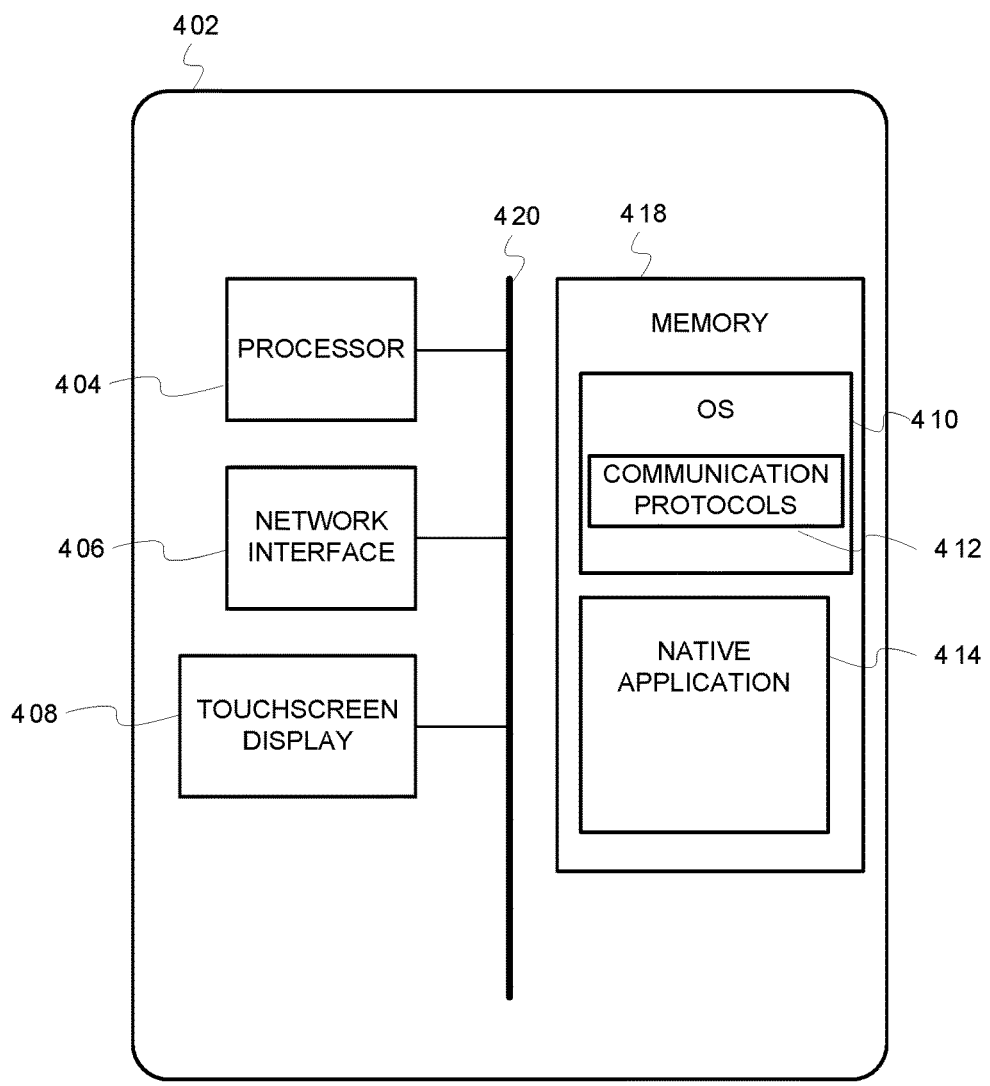
FIG. 4 is a block diagram illustrating a computing device including a native application, according to some embodiments.

FIG. 4 is a block diagram illustrating a computing device including a native application, according to some embodiments. In FIG. 4, a computing device 402 includes a bus 420 connected to a processor 404, network interface 406, and touchscreen display 408, and memory 418. The memory 418 includes an operating system 410 and native application 414. The computing device 402 can be any suitable mobile device, such as a tablet computer (e.g., iPad, Galaxy Tab, etc.), laptop computer, smart phone, etc. The operating system 410 can be any suitable operating system, such as iOS, Windows®, Linux, Android™, etc. The operating system 410 includes communication protocols 412 that facilitate remote communications between the native application 414 and wagering game machines. The communication protocols 412 can include protocols from the Internet protocol suite (e.g., TCP, IP, etc.) and protocols from the OSI stack (e.g., Ethernet, WiFi, etc.).

The native application 414 can be any suitable application configured to run with the operating system 410 (e.g., Android, Windows, iOS, etc.). The native application 414 can be designed to remotely access back office services that are available on wagering game machines. In some embodiments, the native application 414 utilizes the HTTP protocol, and other protocols supported by the operating system 410, to procure information from back office services (e.g., game history) hosted by a wagering game machine. The native application 414 can present the back office content in native user interfaces. In some instances, despite having native interface capabilities, the native application 414 may render HTML documents in presenting content associated with back office services.

Some Example use Cases

This section provides some example "use cases" to illustrate dataflow, operations, and components of some embodiments. The example use cases discussed herein do not constitute an exhaustive list of use cases.

The following use cases show how computing devices can remotely access back office services over a network. In one use case, a computing device remotely accesses a wagering game machine's configuration service to enable a particular protocol on the wagering game machine. Another use case shows how devices can remotely access a wagering game machine's diagnostic service to diagnose problems with machine components. Yet another use case shows how a device can remotely access a wagering game machine's game history to address a player dispute.

Figure 5:
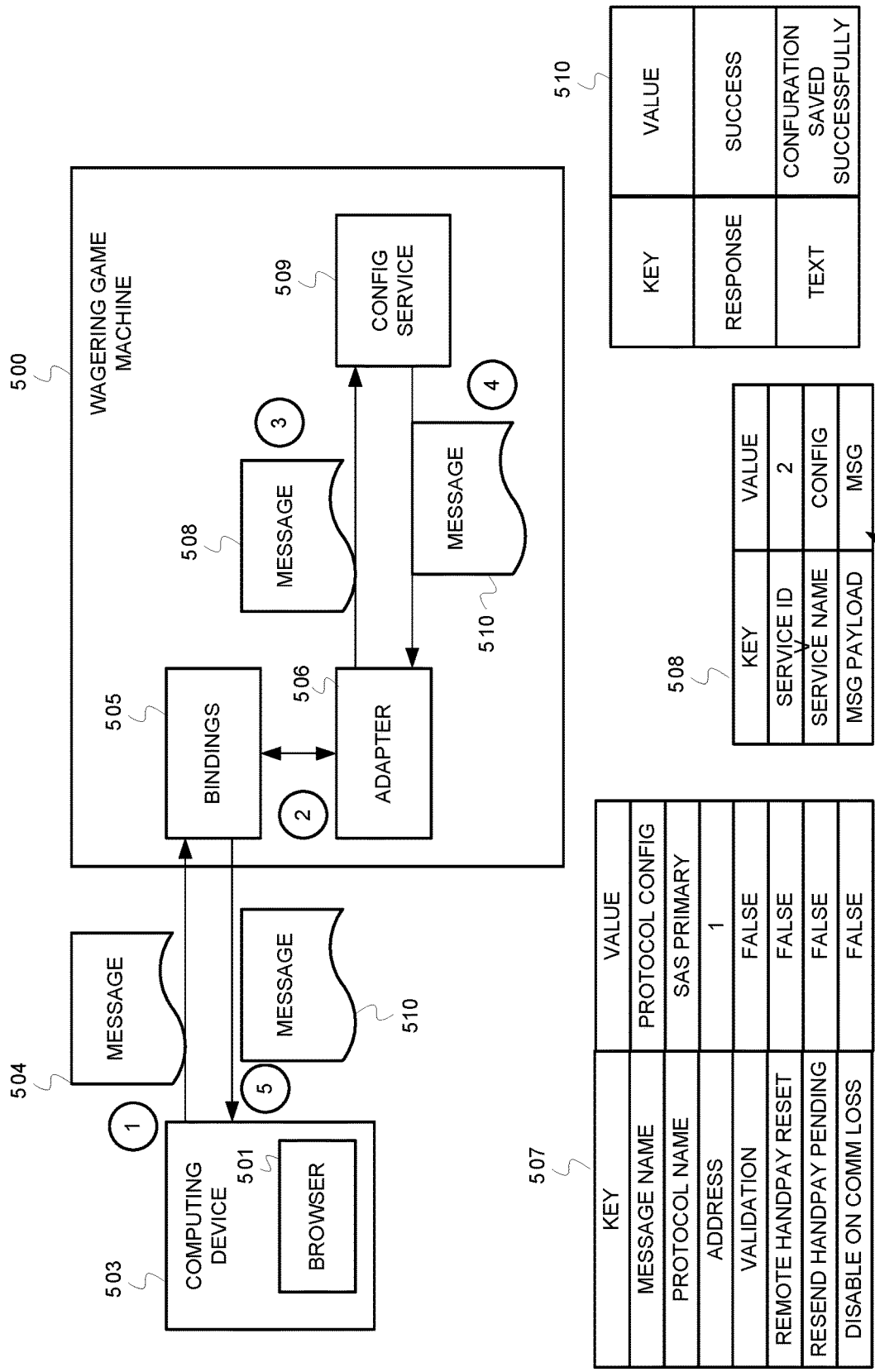
FIG. 5 is a diagram illustrating components, dataflow, and operations for remotely accessing back office configuration services, according to some embodiments.
Figure 6:
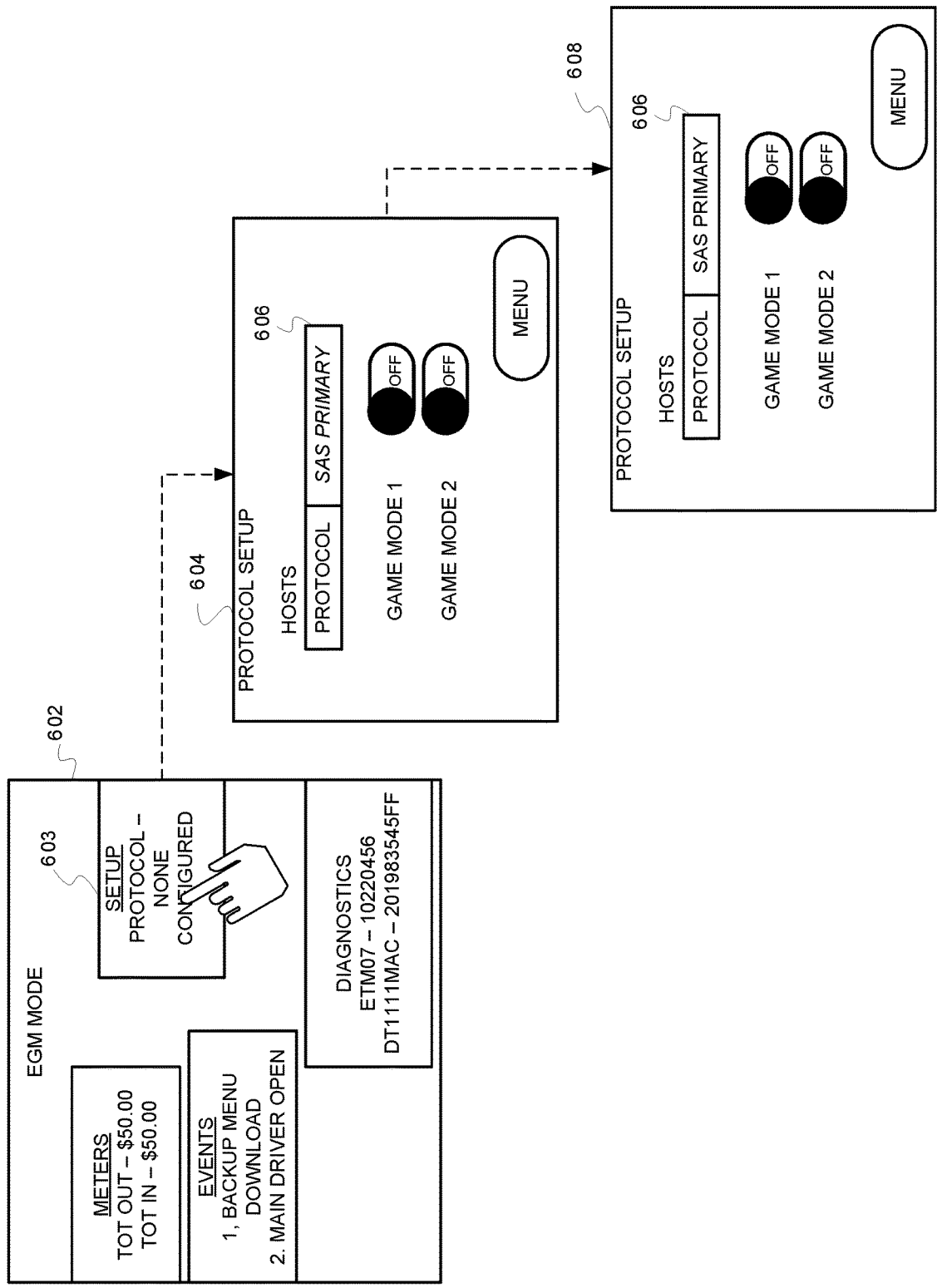
FIG. 6 shows a user interface including a setup area indicating protocol settings enabled on a wagering game machine.

The following use case refers to FIGS. 5 and 6. FIG. 5 shows operations and data flow of some embodiments, whereas FIG. 6 shows user interfaces associated with the operations and data flow.

FIG. 5 is a diagram illustrating components, dataflow, and operations for remotely accessing back office configuration services, according to some embodiments. In FIG. 5, a remote computing device 503 communicates with the wagering game machine 500. The computing device 503 includes a browser 501. The wagering game machine 500 includes bindings 505, an adapter 506, and a configuration service 509. The configuration service 509 can be one of a plurality of back office services available on the machine 500 (e.g., see FIG. 1).

In FIG. 5, the operations occur in five stages. At stage 1, a remote computing device (e.g., see FIG. 3) presents a user interface (e.g., a webpage) through which a user can select a configuration service that is available on the wagering game machine 500. FIG. 6 shows a user interface 602 including a setup area 603 indicating protocol settings enabled on the wagering game machine 500. The setup area 603, when activated, causes presentation of a protocol setup interface 604 (e.g., a webpage). After the user activates the setup interface 603, the browser presents the protocol setup interface 604. The protocol setup interface 604 includes a protocol field 606 in which a user can specify a protocol for the wagering game machine. The protocol field 606 may be initially blank indicating that no protocol is enabled on the machine 500. A user can enter a protocol choice (e.g., "SAS PRIMARY") into the protocol field 606. Referring back to FIG. 5, the browser 501 generates back office services information 507 after receiving the protocol choice in the protocol setup interface 604. The information 507 indicates the protocol choice (e.g., SAS PRIMARY), configuration type (i.e., protocol configuration), and other information useful in remotely accessing the machine's configuration service. The browser 501 transmits, to the wagering game machine 500, a message 504 including the back office services information 507. The browser 501 may transmit the message 504 using a stored URL. The message 504 can include an HTML document including or otherwise referencing the back office services information 507. The wagering game machine's bindings 505 receives the message 504 using protocols of the internet protocol suite, such as SOAP (or REST) over HTTP (or HTTPS) over TCP/IP.

At stage 2, the bindings 505 forward the message 504 to the adapter 506. The adapter 506 uses content in the message 504 to generate another message 508 identifying the configuration service 509 and including the back office services information 507. At stage 3, the adapter 506 transmits the message 508 to the configuration service 509.

At stage 4, the configuration service 509 configures the wagering game machine 500 based on the back office services information 507 included in the message 508. That is, based on the message 508, the configuration service 509 configures the machine 500 to use the SAS PRIMARY protocol. Additionally, the configuration service 509 generates a status message 510 (e.g., an HTML document) indicating that the configuration was successful and transmits the message to the adapter 506. At stage 5, the adapter 506 transmits the status message 510 to the bindings 505. In turn, the bindings 505 transmit the message 510 to the computing device 503. Upon receipt of the status message 510, the computing device's browser renders a user interface 608 (see FIG. 6) indicating that the machine's protocol has been set to SAS PRIMARY (see field 606). In some embodiments, the device's browser 501 creates the interface 608 by rendering an HTML document included in the message 510.

This discussion continues with another use case showing how embodiments enable computing devices to remotely access back office services on wagering game machines.

Figure 7:
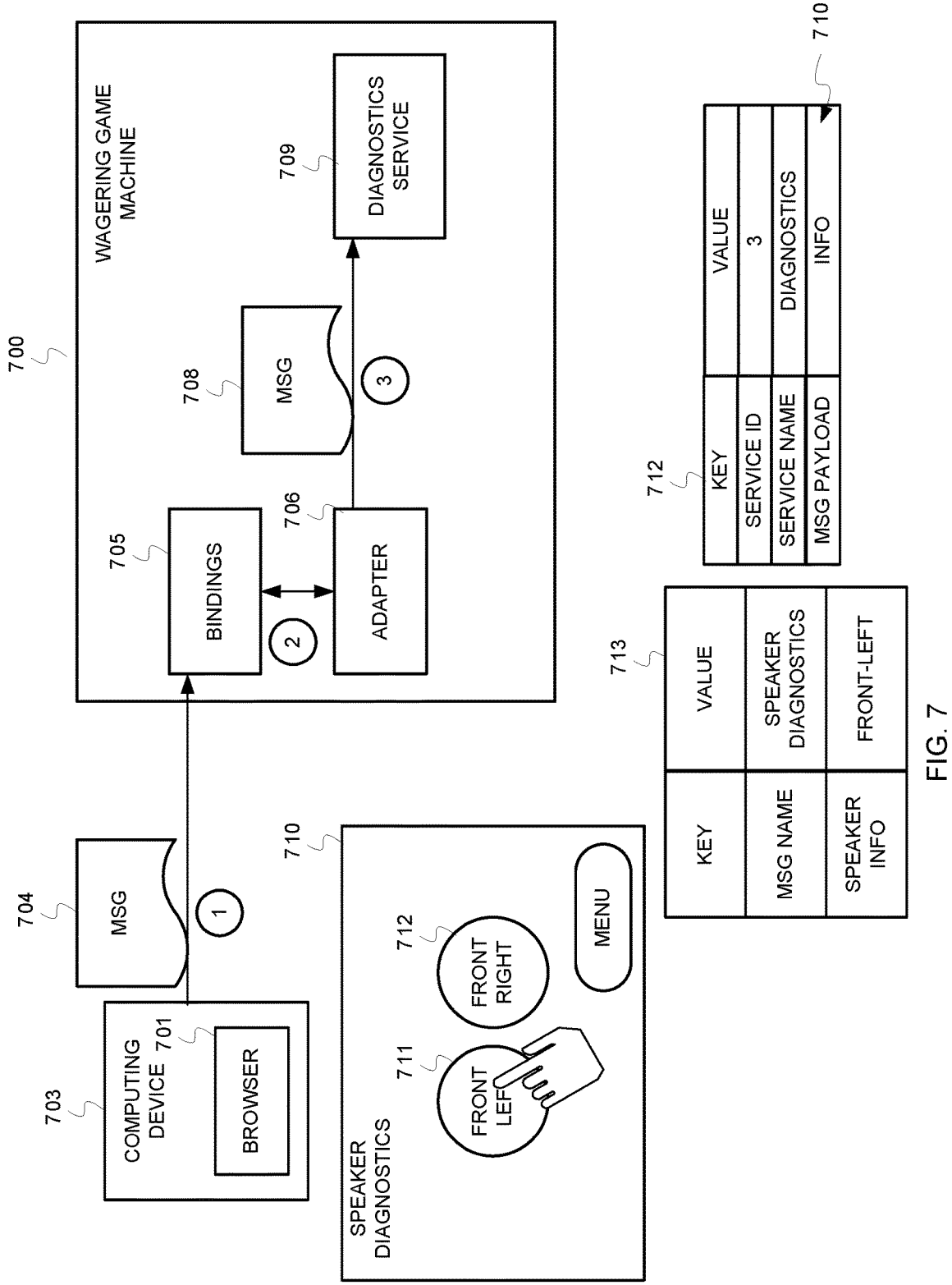
FIG. 7 is a block diagram illustrating components and data flow for remotely accessing a back office diagnostic service, according to embodiments of the inventive subject matter.

FIG. 7 is a block diagram illustrating components and data flow for remotely accessing a back office diagnostic service, according to embodiments of the inventive subject matter. In FIG. 7, a remote computing device 703 includes a browser 701. The computing device 703 communicates with a wagering game machine 700. The wagering game machine 700 includes binding 705, adapter 706, and diagnostics service 709. The data flow and operations occur in three stages.

At stage 1, the computing device's browser 701 presents a menu (not shown) of back office services available on the machine 700. From the menu, a user launches a diagnostics interface 710 associated with a diagnostics service that will diagnose technical issues with the machine's audio speakers. The diagnostics interface 710 includes selectable icons 711 and 712 that enable the user to select an audio speaker on the machine 700. As shown, the user selects the icon 711 indicating the machine's front left audio speaker. In response to the selection, the browser 701 generates information 713 useful for activating the diagnostics service 709. The information 713 can include a message name (e.g., speaker diagnostics) and speaker information (e.g., front-left). In turn, the browser 701 creates a message 704 which can include an HTML document including the information 713. The browser 701 transmits the message 704 to the binding 705 using a stored URL.

At stage 2, the bindings 705 receive the message 704 using protocols from the Internet protocol suite, such as HTTP or HTTPS over TCP/IP. The bindings 705 forward the message 704 to the adapter 706. The adapter 706 creates, based on the message 704, back office services information 712 that is meaningful to the diagnostics service 709. The back office services information 712 includes a service name (e.g., diagnostics service), the information 713, and other information useful in activating the diagnostic service 709.

At stage 3, the adapter 706 transmits, to the diagnostics service 709, the back office services information 712 in a message 708. The diagnostic service 709 receives the message 708 and performs diagnostics services on the left front audio speaker (not shown) of the machine 700. Although not shown, the diagnostic service 709 may transmit a status message back to the browser 701 (e.g., via the adapter 706 and bindings 705). The status message can indicate whether the audio speaker is properly functioning and can include other relevant information.

Figure 8:
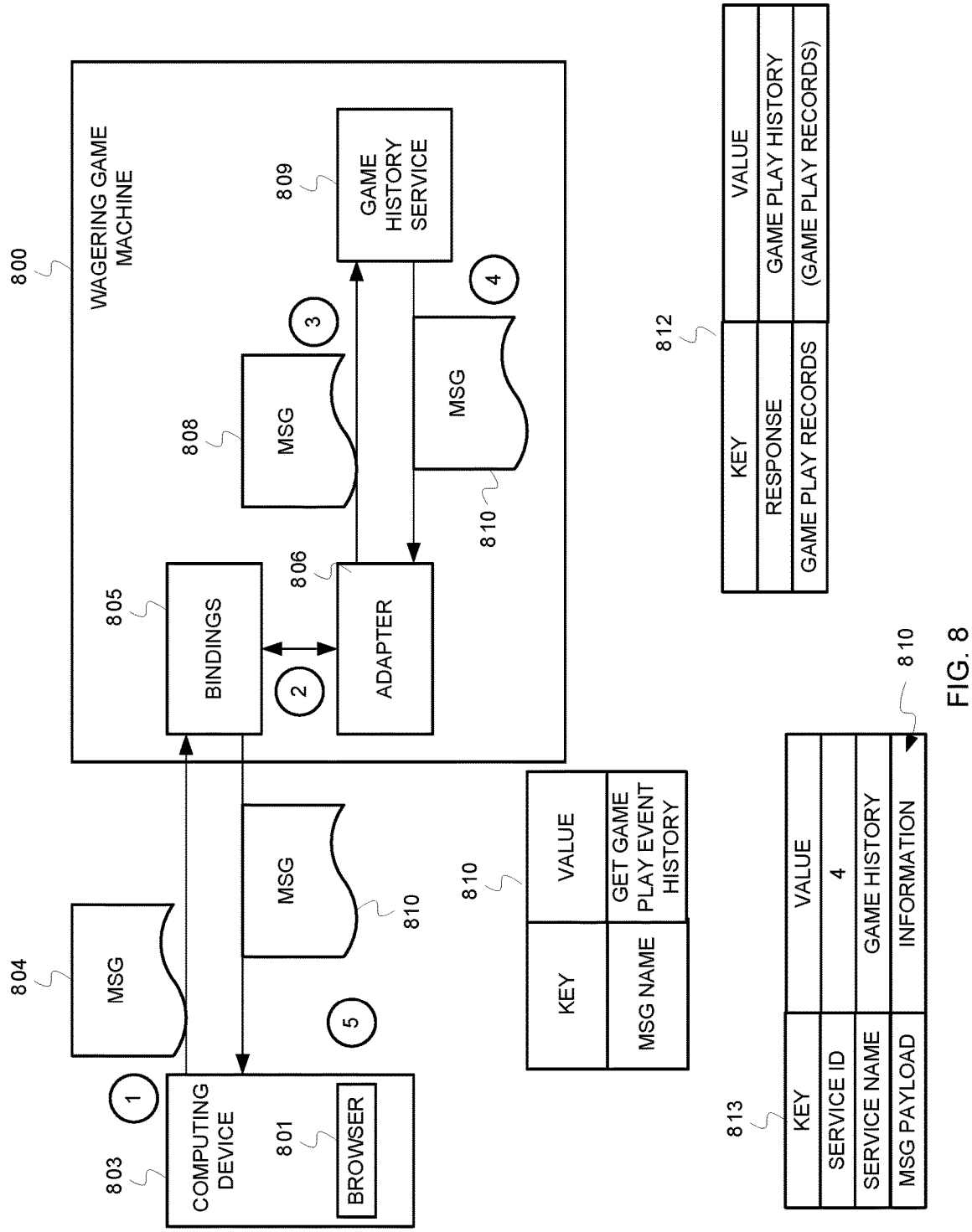
FIG. 8 is a block diagram illustrating components and data flow for remotely accessing a back office game history service, according to embodiments of the inventive subject matter.
Figure 9:
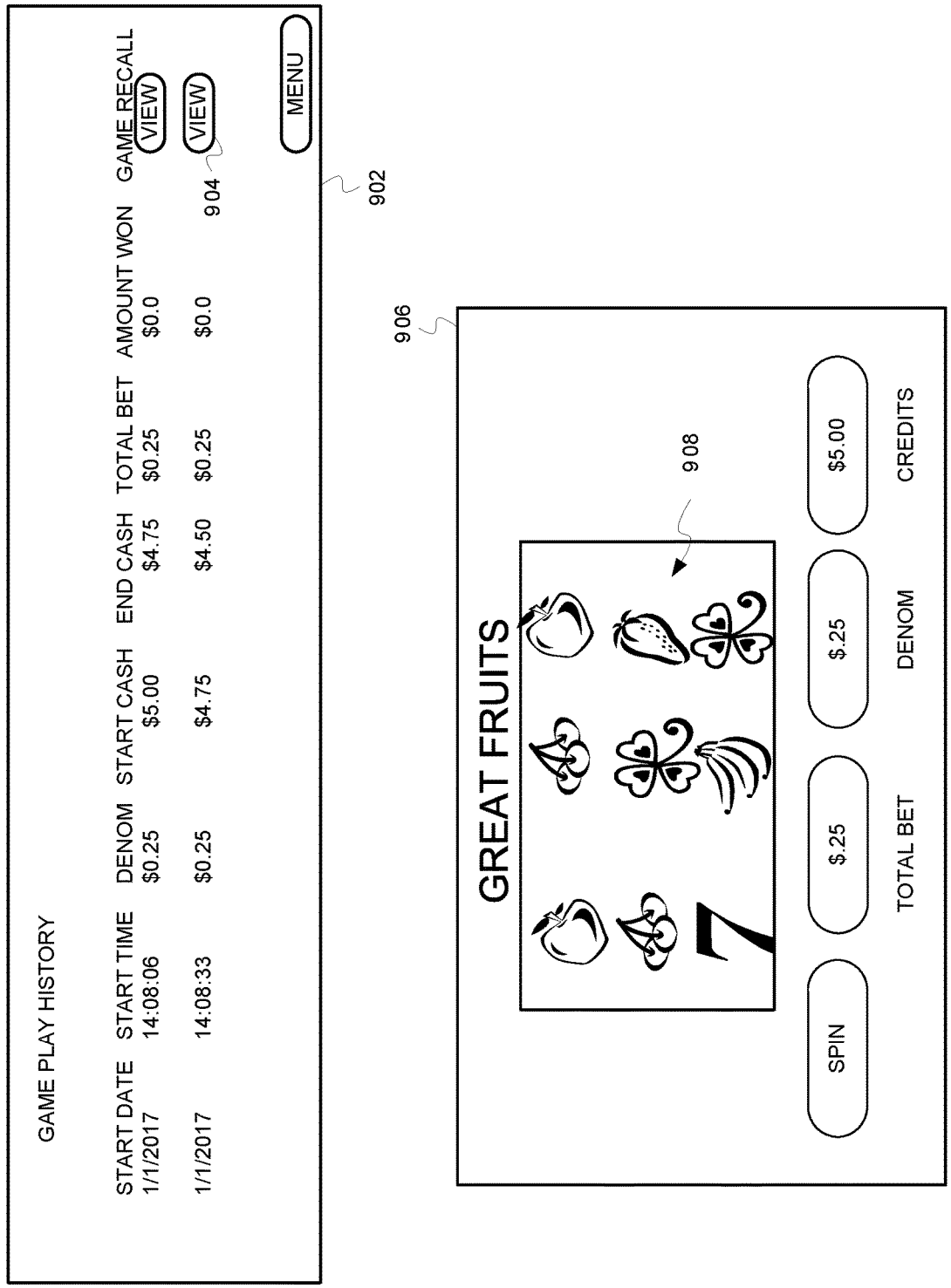
FIG. 9 shows user interfaces associated with a game history back office service.

In yet another use case, embodiments enable devices to remotely access game history services offered by wagering game machines. FIG. 8 shows operations and data flow for remotely accessing a machine's game history service, and FIG. 9 shows associated user interfaces.

FIG. 8 is a block diagram illustrating components and data flow for remotely accessing a back office game history service, according to embodiments of the inventive subject matter. In FIG. 8, a remote computing device 803 includes a browser 801. The computing device 803 communicates with a wagering game machine 800. The wagering game machine 800 includes bindings 805, adapter 806, and game history service 809. The data flow and operations occur in five stages.

At stage 1, the computing device's browser 801 presents a menu (not shown) of back office services available on the machine 800. From the menu, a user selects a game history service that will provide game history information about wagering games presented on the machine 800. In response to the game history service selection, the browser 801 generates back office information 810 including a back office services message name and back office services request message. The information 810 can include any other information useful in acquiring the back office game history service. The browser 801 transmits a message 804 including the information 810 to the bindings 805. The message 804 can include an HTML document including or otherwise referencing the information 810.

At stage 2, the bindings 805 receive the message 804 using protocols in the Internet protocol suite. For example, the bindings 805 may receive the message 804 using HTTP or HTTPS over TCP/IP. After receiving the message 804, the adapter 806 generates back office services information 813 which includes a service name (e.g., game history), the information 810, and other information relevant to utilizing the game history service 809.

At stage 3, the adapter 806 transmits, to the game history service 809, a message 808 including the back office services information 813. After receiving the message 808, the game history service 809 determines game history information 812. The game history information 812 includes game play records indicating game times, game denominations, game pay tables, starting cash values, and the cash values, total bets, game snapshots, game results, etc.

At stage 4, the game history service 809 transmits a message 810 to the adapter 806, where the message 810 includes the game history information 812. The adapter 806 forwards the message 810 to the bindings 805 and on to the browser 801. In some embodiments, the message 810 includes an HTML document including or otherwise referencing the game history information 812.

At stage 5, the browser 801 presents a game history interface 902 (see FIG. 9) showing game history of the wagering game machine 800. Additionally, upon activation of an interface control 904 and associated URL, the browser 801 presents a game image 906 (see FIG. 9) based on the game history information 812. A user may utilize the interfaces shown in FIG. 9 to address a dispute over game results of the wagering game machine 800. Because the interfaces 902 and 906 are presented on the computing device 803, there is no need to interrupt game play on the wagering game machine 800.

Although FIGS. 5, 7, and 8 show a computing device including a browser, some embodiments operate differently. Instead of including a browser, some embodiments include a native application capable of remotely accessing back office services on a wagering game machine (see FIG. 4). Like the browser embodiments, the native application may utilize the Internet protocol suite to access back office services on a wagering game machine. However, instead of rendering HTML documents to generate its user interfaces, the native application may use alternate techniques that do not require HTML document rendering. Such alternate techniques may result in user interfaces similar to those shown in FIGS. 6, 7, and 9. Therefore, native applications may engage in the operations and data flow shown in FIGS. 5, 7, and 8.

In FIGS. 5, 7, and 8, browsers reside on remote devices. These remote browsers remotely access services hosted by the wagering game machine. In contrast to these embodiments, some embodiments facilitate local access to services on the wagering game machine. In some embodiments, local browsers can access local back office services in a manner similar to the use cases described above. That is, a wagering game machine can offer back office services to a local browser. Operations and messages would be the same, but the messages would not travel across a network. Instead, the messages would traverse communication channels inside the wagering game machine. As a result, the bindings and adapter would process the same messages shown in FIGS. 5, 7, and 8.

Example Operations

This section describes operations associated with some embodiments of the invention. In the discussion below, the flow diagrams will be described with reference to components discussed above. However, in some embodiments, the operations can be performed by components not described above.

In certain embodiments, the operations described herein can be performed by executing instructions residing on machine-readable media (e.g., software), while in other embodiments, the operations can be performed by hardware and/or other components (e.g., firmware). In some embodiments, the operations can be performed in series, while in other embodiments, one or more of the operations can be performed in parallel. Moreover, some embodiments can perform less than all the operations shown in any diagram herein.

Figure 10:
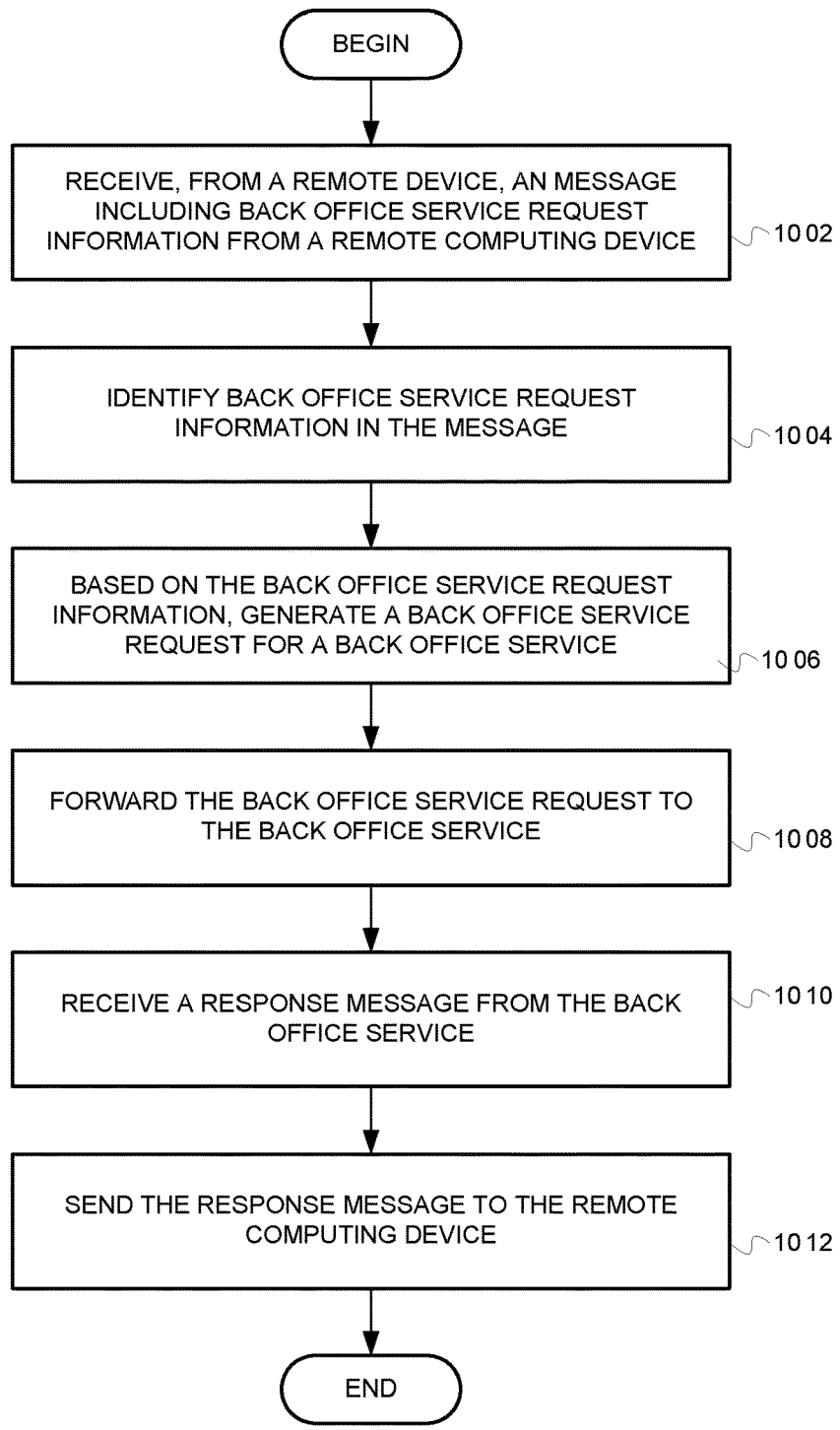
FIG. 10 is a flow diagram illustrating operations for processing back office service requests, according some embodiment of the inventive subject matter.

FIG. 10 is a flow diagram illustrating operations for processing back office service requests, according some embodiment of the inventive subject matter. In some embodiments, the flow 1000 is performed by a wagering game machine.

At block 1002, wagering game machine's bindings receive a message including back office service request information from a remote computing device. The back office service request information can identify a back office service and information for utilizing the service. In some embodiments, the bindings receive the message via HTTP (or HTTPS) over TCP/IP or other protocols in the Internet protocol suite. The message may include an HTML document including or otherwise referencing the back office service request information. The flow continues at block 1004.

At block 1004, the wagering game machine's adapter identifies back office services request information in the message. The back office services request information can indicate a back office service (e.g., configuration, game history, etc.) and information needed to utilize the service (e.g., a protocol for configuration, identification of a component for diagnostics, etc.).

At block 1006, the adapter generates a back office service request in a form suited for one of a plurality of back office services available on the wagering game machine. The back office service request can include information identifying a back office service (e.g., game history service, diagnostics service, etc.) and identifying parameters for the back office service. At block 1008, the adapter forwards the back office service request to back office services available on the wagering game machine. In some embodiments, all back office services receive all requests. In other embodiments, the wagering game machine includes a routing mechanism that routes requests to the proper back office service. Upon receiving the back office service request, the service processes the request and sends a response message. Processing the request may entail performing any suitable back office service, such as those described vis-à-vis FIGS. 5-9. The flow continues at block 1010.

At block 1010, the adapter receives a response message from the back office service. For example, the adapter may receive a message including game history information or other information arising from performance of back office services. At block 1012, the adapter transmits the response message to the remote computing device. In some implementations, the adapter transmits the message to bindings that utilize protocols from the Internet protocol suite to forward the message to the computing device. In some embodiments, the message includes an HTML document representing or otherwise referencing information related to the back office service. From block 1012, the flow ends.

While the discussion of FIG. 10 describes receipt and transmission of messages to a remote browser (see 1002 and 1012), some embodiments work with local browsers. For such embodiments, the messages at 1002 is received from a local browser and the message at 1012 is delivered to the local browser. Also, the remote devices need not include browsers, as they may have native applications that call back office services on remote wagering game machines (as described herein).

More about Some Embodiments

While this inventive subject matter is susceptible of embodiment in many different forms, there is shown in the drawings and will herein be described in detail preferred embodiments of the invention subject matter with the understanding that the present disclosure is to be considered as an exemplification of the principles of the invention subject matter and is not intended to limit the broad aspect of the invention subject matter to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Figure 11:
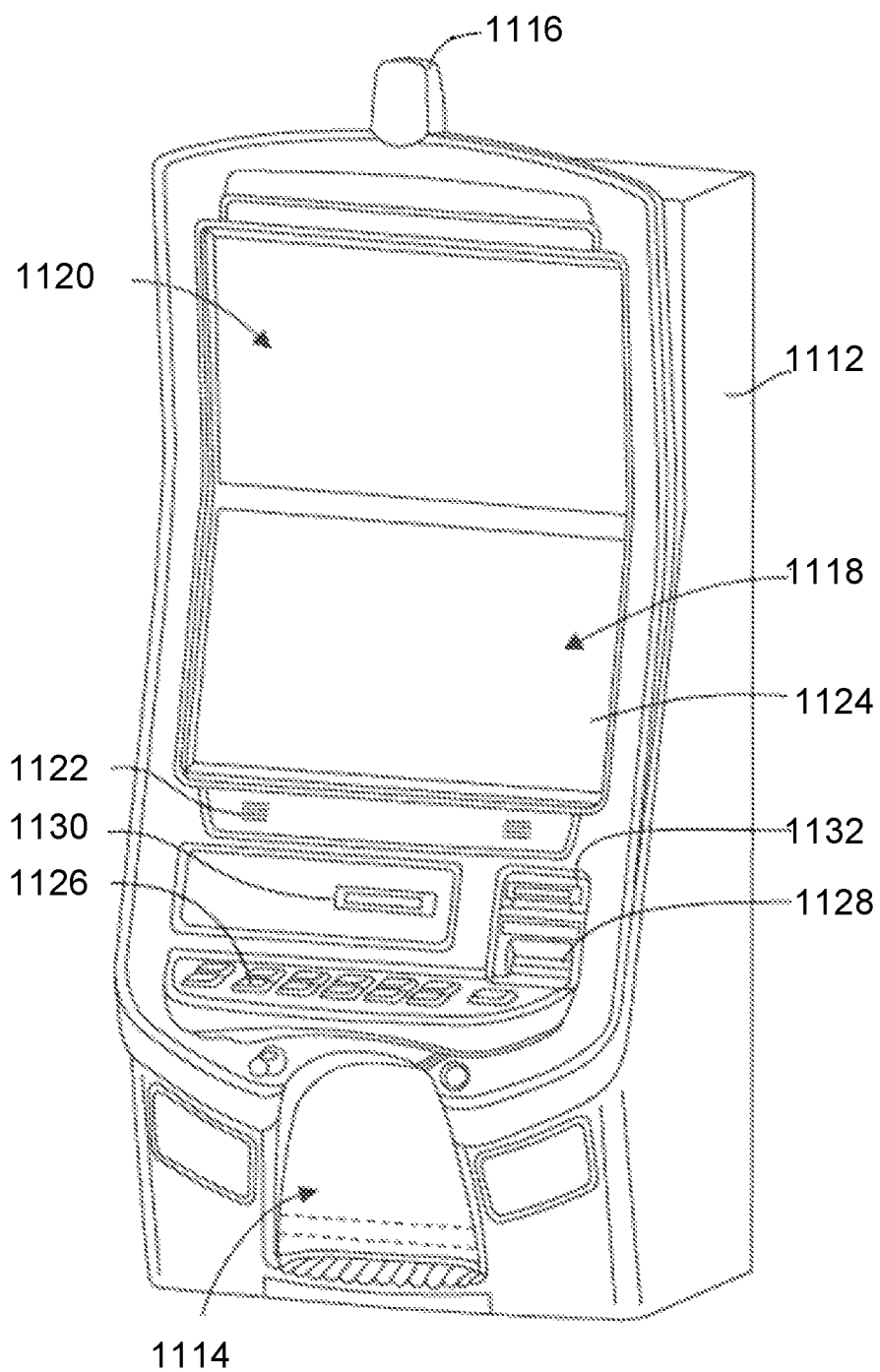
FIG. 11 is a perspective view of a wagering game machine, according to some embodiments of the inventive subject matter.

Referring to FIG. 11, there is shown a wagering game machine 1110 similar to those operated in gaming establishments, such as casinos. In this disclosure, the terms "wagering game machine" and "gaming machine" are used interchangeably. The wagering game machine 1110 may be any type of gaming terminal or machine and may have varying structures and methods of operation. For example, in some aspects, the wagering game machine 1110 is an electromechanical gaming terminal configured to play mechanical slots, whereas in other aspects, the wagering game machine is an electronic gaming terminal configured to play a video casino game, such as slots, keno, poker, blackjack, roulette, craps, etc. The wagering game machine 1110 may take any suitable form, such as floor-standing models as shown, handheld mobile units, bartop models, workstation-type console models, etc. Further, the wagering game machine 1110 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The wagering game machine 1110 illustrated in FIG. 11 comprises a gaming cabinet 1112 that securely houses various input devices, output devices, input/output devices, internal electronic/electromechanical components, and wiring. The cabinet 1112 includes exterior walls, interior walls and shelves for mounting the internal components and managing the wiring, and one or more front doors that are locked and require a physical or electronic key to gain access to the interior compartment of the cabinet 1112 behind the locked door. The cabinet 1112 forms an alcove 1114 configured to store one or more beverages or personal items of a player. A notification mechanism 1116, such as a candle or tower light, is mounted to the top of the cabinet 1112. It flashes to alert an attendant that change is needed, a hand pay is requested, or there is a potential problem with the wagering game machine 1110.

The input devices, output devices, and input/output devices are disposed on, and securely coupled to, the cabinet 1112. By way of example, the output devices include a primary display 1118, a secondary display 1120, and one or more audio speakers 1122. The primary display 1118 or the secondary display 1120 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1110. The wagering game machine 1110 includes a touch screen(s) 1124 mounted over the primary or secondary displays, buttons 1126 on a button panel, a bill/ticket acceptor 1128, a card reader/writer 1130, a ticket dispenser 1132, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 1124, buttons 1126, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The wagering game machine 1110 includes one or more value input/payment devices and value output/payout devices. In order to deposit cash or credits onto the wagering game machine 1110, the value input devices are configured to detect a physical item associated with a monetary value that establishes a credit balance on a credit meter such as the "credits" meter 1184. The physical item may, for example, be currency bills, coins, tickets, vouchers, coupons, cards, and/or computer-readable storage mediums. The deposited cash or credits are used to fund wagers placed on the wagering game played via the wagering game machine 1110. Examples of value input devices include, but are not limited to, a coin acceptor, the bill/ticket acceptor 1128, the card reader/writer 1130, a wireless communication interface for reading cash or credit data from a nearby mobile device, and a network interface for withdrawing cash or credits from a remote account via an electronic funds transfer. In response to a cash-out input that initiates a payout from the credit balance on the "credits" meter 1184, the value output devices are used to dispense cash or credits from the wagering game machine 1110. The credits may be exchanged for cash at, for example, a cashier or redemption station. Examples of value output devices include, but are not limited to, a coin hopper for dispensing coins or tokens, a bill dispenser, the card reader/writer 1130, the ticket dispenser 1132 for printing tickets redeemable for cash or credits, a wireless communication interface for transmitting cash or credit data to a nearby mobile device, and a network interface for depositing cash or credits to a remote account via an electronic funds transfer.

Figure 12:
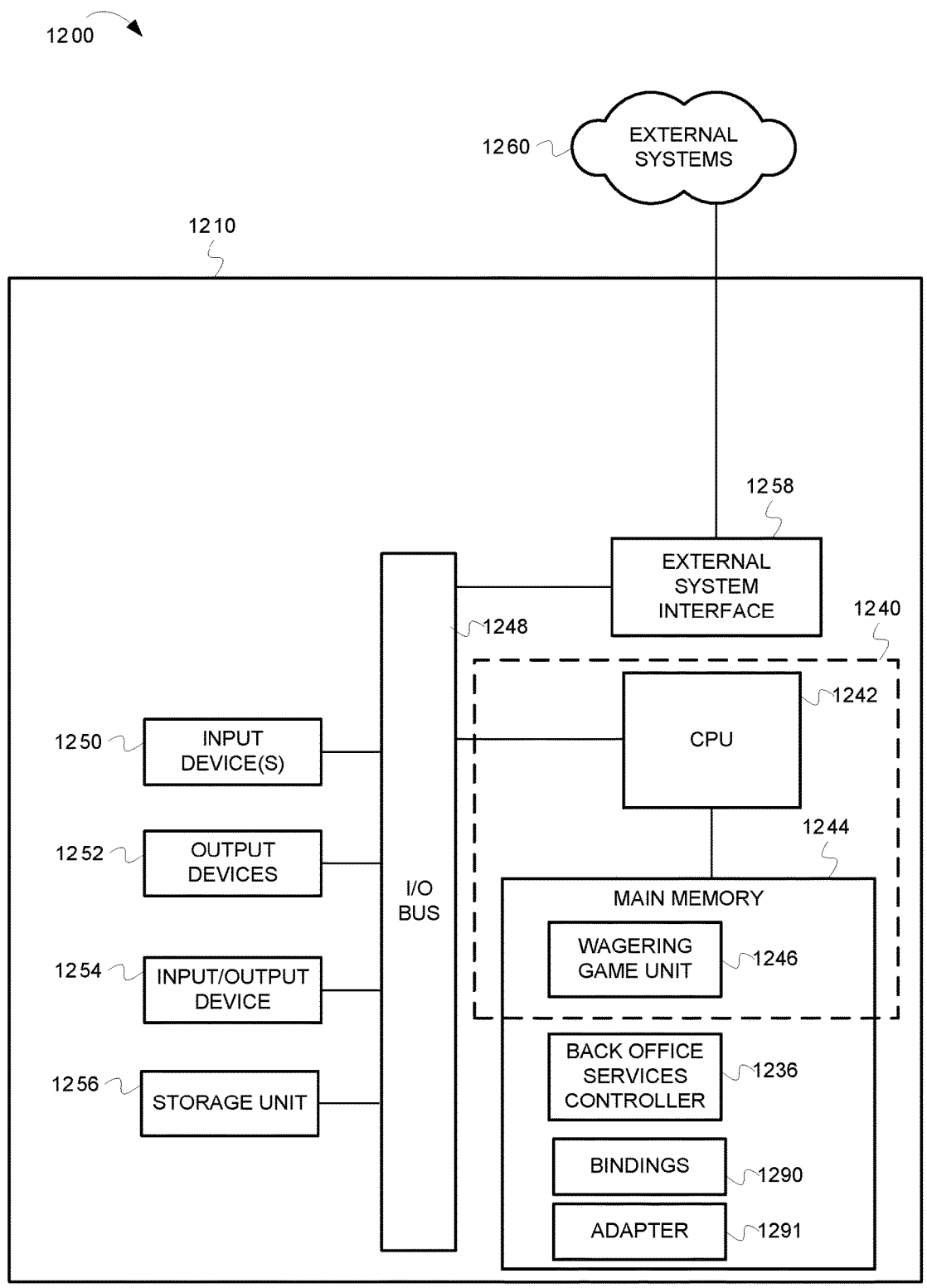
FIG. 12 is a block diagram of the gaming-machine architecture, according to some embodiments of the inventive subject matter.

Turning now to FIG. 12, there is shown a block diagram of the gaming-machine architecture. The wagering game machine 1210 includes game-logic circuitry 1240 securely housed within a locked box inside the gaming cabinet 1212 (see FIG. 11). The game-logic circuitry 1240 includes a central processing unit (CPU) 1242 connected to a main memory 1244 that comprises one or more memory devices. The CPU 1242 includes any suitable processor(s), such as those made by Intel and AMD. By way of example, the CPU 1242 includes a plurality of microprocessors including a master processor, a slave processor, and a secondary or parallel processor. Game-logic circuitry 1240, as used herein, comprises any combination of hardware, software, or firmware disposed in or outside of the wagering game machine 1210 that is configured to communicate with or control the transfer of data between the wagering game machine 1210 and a bus, another computer, processor, device, service, or network. The game-logic circuitry 1240, and more specifically the CPU 1242, comprises one or more controllers or processors and such one or more controllers or processors need not be disposed proximal to one another and may be located in different devices or in different locations. The game-logic circuitry 1240, and more specifically the main memory 1244, comprises one or more memory devices which need not be disposed proximal to one another and may be located in different devices or in different locations. The game-logic circuitry 1240 is operable to execute all of the various gaming methods and other processes disclosed herein. The main memory 1244 includes a wagering-game unit 1246. In one embodiment, the wagering-game unit 1246 causes wagering games to be presented, such as video poker, video black jack, video slots, video lottery, etc., in whole or part.

The game-logic circuitry 1240 is also connected to an input/output (I/O) bus 48, which can include any suitable bus technologies, such as an AGTL+ frontside bus and a PCI backside bus. The I/O bus 48 is connected to various input devices 1250, output devices 1252, and input/output devices 1254 such as those discussed above in connection with FIG. 11. The I/O bus 1248 is also connected to a storage unit 1256 and an external-system interface 1258, which is connected to external system(s) 1260 (e.g., wagering-game networks).

The main memory 1244 includes back office services controller 1236. The back office services controller 1236 can include a plurality of controllers each for performing a separate back office service (e.g., see FIG. 1). Alternatively, the back office services 1236 can perform a plurality of back office services.

The main memory 1244 also includes bindings 1290 and adapter 1291. In some embodiments the bindings 1290 enables the wagering game machine 1210 to communicate with remote devices using the internet protocol suite. In other embodiments, the bindings 1290 are configured to facilitate internal communications between a browser (not shown) and the back office services controller 1246 via HTTP. The adapter 1291 can receive messages related to back office services and generate information that facilities delivery of back office services. In some embodiments, the back office services controller 1236, bindings 1290, and adapter 1291 can perform the operations described herein. In some embodiments, the wagering game machines described herein (e.g., wagering game machine 1210) can perform operations for providing back office services contemporaneously with operations for presenting wagering games. In some embodiments, the wagering game machine 1210 can perform operations described below vis-à-vis FIG. 13 (i.e., operations for a game session) in parallel with the back office operations described above.

The external system 1260 includes, in various aspects, a gaming network, other wagering game machines or terminals, a gaming server, a remote controller, communications hardware, or a variety of other interfaced systems or components, in any combination. In yet other aspects, the external system 1260 comprises a player's portable electronic device (e.g., cellular phone, electronic wallet, etc.) and the external-system interface 1258 is configured to facilitate wireless communication and data transfer between the portable electronic device and the wagering game machine 1210, such as by a near-field communication path operating via magnetic-field induction or a frequency-hopping spread spectrum RF signals (e.g., Bluetooth, etc.).

The wagering game machine 1210 optionally communicates with the external system 1260 such that the wagering game machine 1210 operates as a thin, thick, or intermediate client. The game-logic circuitry 1240—whether located within ("thick client"), external to ("thin client"), or distributed both within and external to ("intermediate client") the wagering game machine 1210—is utilized to provide a wagering game on the wagering game machine 1210. In general, the main memory 1244 stores programming for a random number generator (RNG), game-outcome logic, and game assets (e.g., art, sound, etc.)—all of which obtained regulatory approval from a gaming control board or commission and are verified by a trusted authentication program in the main memory 1244 prior to game execution. The authentication program generates a live authentication code (e.g., digital signature or hash) from the memory contents and compare it to a trusted code stored in the main memory 1244. If the codes match, authentication is deemed a success and the game is permitted to execute. If, however, the codes do not match, authentication is deemed a failure that must be corrected prior to game execution. Without this predictable and repeatable authentication, the wagering game machine 1210, external system 1260, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 1242 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 1242 when executing the game-outcome logic to determine a resultant outcome for that instance of the wagering game. The resultant outcome is then presented to a player of the wagering game machine 1210 by accessing the associated game assets, required for the resultant outcome, from the main memory 1244. The CPU 1242 causes the game assets to be presented to the player as outputs from the wagering game machine 1210 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The wagering game machine 1210 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The wagering game machine 1210 may include additional peripheral devices or more than one of each component shown in FIG. 12. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 13:
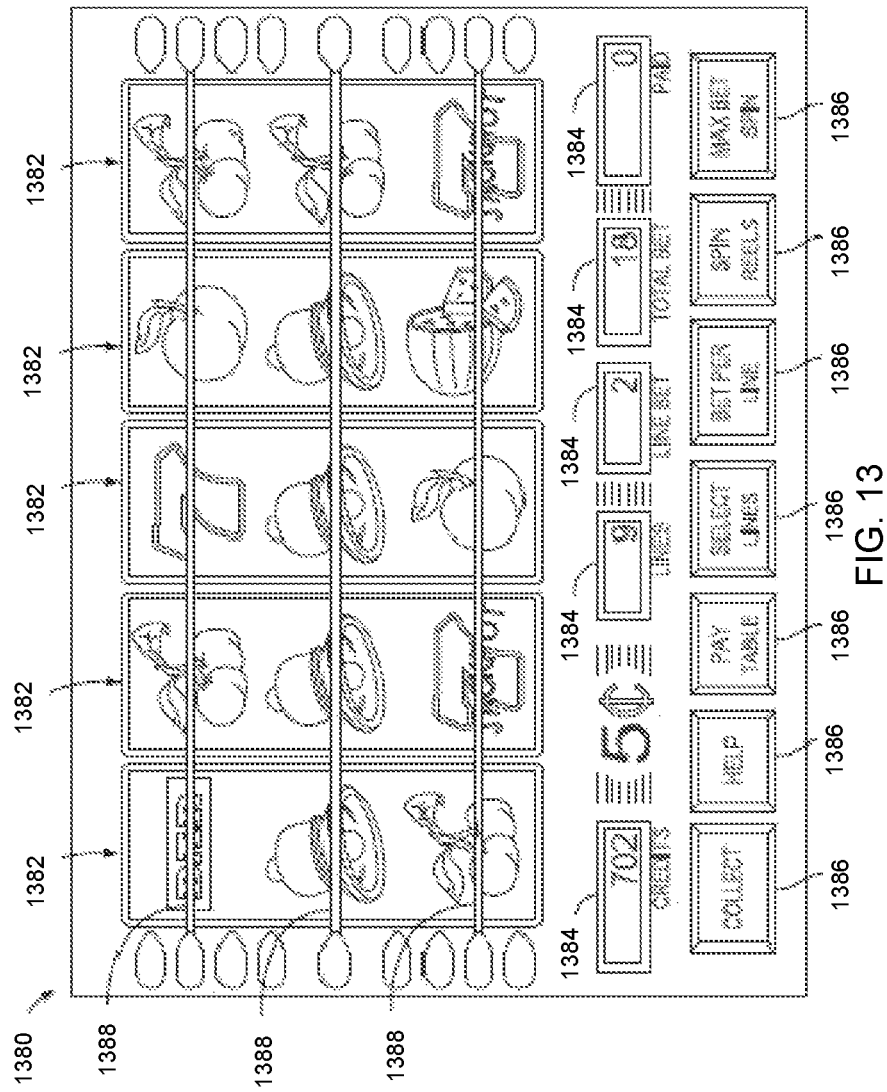
FIG. 13 illustrates a basic-game screen adapted for display on a primary or secondary display.

Referring now to FIG. 13, there is illustrated an image of a basic-game screen 1380 adapted to be displayed on the primary display 1118 or the secondary display 1320. The basic-game screen 1380 portrays a plurality of simulated symbol-bearing reels 1382. Alternatively or additionally, the basic-game screen 1380 portrays a plurality of mechanical reels or other video or mechanical presentation consistent with the game format and theme. The basic-game screen 1380 also advantageously displays one or more game-session credit meters 1384 and various touch screen buttons 86 adapted to be actuated by a player. A player can operate or interact with the wagering game using these touch screen buttons or other input devices such as the buttons 1126 shown in FIG. 11. The wagering game unit 1246 operates to execute a wagering-game program causing the primary display 1118 or the secondary display 1120 to display the wagering game.

In response to receiving an input indicative of a wager covered by or deducted from the credit balance on the "credits" meter 1384, the reels 1382 are rotated and stopped to place symbols on the reels in visual association with paylines such as paylines 1388. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the wagering game machine 1110 depicted in FIG. 11, following receipt of an input from the player to initiate a wagering-game instance. The wagering game machine 1110 then communicates the wagering-game outcome to the player via one or more output devices (e.g., primary display 1118 or secondary display 1120) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 1240 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 1142 causes the recording of a digital representation of the wager in one or more storage media (e.g., storage unit 1156), the CPU 1142, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 1142 (e.g., the wager in the present example). As another example, the CPU 1142 further, in accord with the execution of the stored instructions relating to the wagering game, causes the primary display 1118, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 1140 to determine the outcome of the wagering-game instance. In at least some aspects, the game-logic circuitry 1140 is configured to determine an outcome of the wagering-game instance at least partially in response to the random parameter.

In one embodiment, the wagering game machine 10 and, additionally or alternatively, the external system 1160 (e.g., a gaming server), means gaming equipment that meets the hardware and software requirements for fairness, security, and predictability as established by at least one state's gaming control board or commission. Prior to commercial deployment, the wagering game machine 1210, the external system 1260, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a wagering game machine in Nevada means a device as set forth in NRS 463.0155, 463.0191, and all other relevant provisions of the Nevada Gaming Control Act, and the wagering game machine cannot be deployed for play in Nevada unless it meets the minimum standards set forth in, for example, Technical Standards 1 and 2 and Regulations 5 and 14 issued pursuant to the Nevada Gaming Control Act. Additionally, the wagering game machine and the casino wagering game must be approved by the commission pursuant to various provisions in Regulation 14. Comparable statutes, regulations, and technical standards exist in other gaming jurisdictions. As can be seen from the description herein, the wagering game machine 1210 may be implemented with hardware and software architectures, circuitry, and other special features that differentiate it from general-purpose computers (e.g., desktop PCs, laptops, and tablets).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations (e.g., operations described with respect to the flow diagrams) for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for a wagering game machine providing back office services to a mobile remote computing device, the method comprising:
   receiving over a network, by bindings of the wagering game machine via Hyper Text Transfer Protocol (HTTP), a first message from the mobile remote computing device and including information for accessing a back office service of the wagering game machine;
   identifying, by an adapter of the wagering game machine, the back office service based on the information;
   generating, by the adapter, a back office service request based on the information;
   providing, by the adapter, the back office service request to a back office service controller;
   performing, by the back office service controller, the back office service;
   generating, by the back office service controller, information related to performance of the back office service responsive to the back office service request;
   receiving, by the adapter from the back office service controller, a second message including the information related to performance of the back office service;
   transmitting, via the bindings, the second message to the mobile remote computing device over the network via the HTTP protocol.

2. The method of claim 1 wherein the back office service is one of a configuration service, diagnostics service, game history service, accounting service, or validation service.

3. The method of claim 1 wherein the wagering game machine has a Uniform Resource Locator (URL) associated with the mobile remote computing device, and wherein the URL is used for transmitting the second message.

4. The method of claim 1, wherein the first message includes an Hyper Text Markup Language document originating from a browser on the mobile remote computing device.

5. The method of claim 1, wherein the first message includes a URL and parameters originating from a native application on the mobile remote computing device.

6. A method of operating a gaming system, the gaming system including game-logic circuitry and a regulated wagering game machine, the wagering game machine primarily dedicated to presenting a gaming session during which at least one casino wagering game is played, the wagering game machine including an electronic display device and one or more electronic input devices, the method comprising:
   detecting, via at least one of the one or more electronic input devices, a physical item associated with a monetary value that establishes a credit balance;
   initiating the gaming session in response to the detecting;
   during the gaming session,
      detecting an input indicative of a wager covered by the credit balance;
      receiving, by bindings of the wagering game machine over a network via Hyper Text Transfer Protocol (HTTP), a first message from a mobile remote computing device and including information for accessing a back office service of the wagering game machine;
      providing, by an adapter and based on the information, a back office service request to a back office service controller;
      performing, by the back office service controller, the back office service;
      determining, by the adapter and responsive to the back office service request, information related to performance of the back office service;
      transmitting, via the bindings, a second message to the mobile remote computing device over the network via the HTTP protocol, wherein the second message includes the information related to performance of the back office service; and
      receiving, via at least one of the one or more electronic input devices, a cashout input that ends the gaming session and initiates a payout from the credit balance.

7. The method of claim 6 wherein the back office service is one of a configuration service, diagnostics service, game history service, accounting service, or validation service.

8. The method of claim 6 wherein the wagering game machine has a Uniform Resource Locator (URL) associated with the mobile remote computing device, and wherein the URL is used for transmitting the second message.

9. The method of claim 6, wherein the first message includes an Hyper Text Markup Language document originating from a browser on the mobile remote computing device.

10. The method of claim 6, wherein the first message includes a URL and parameters originating from a native application on the mobile remote computing device.

11. A non-transitory computer-readable storage medium including computer executable program code to control a wagering game machine to provide back office services to a remote computing device, the computer executable program code comprising:
   code to receive, by bindings of the wagering game machine over a network via Hyper Text Transfer Protocol (HTTP), a first message from the remote computing device and including information for accessing a back office service of the wagering game machine;
   code to identify, by an adapter of the wagering game machine, the back office service based on the information;
   code to generate, by the adapter, a back office service request based on the information;
   code to provide, by the adapter, the back office service request to a back office service controller;
   code to perform, by the back office service controller, the back office service;
   code to generate, by the back office service controller and responsive to the back office service request, information related to performance of the back office service;
   code to receive, by the adapter from the back office service controller, a second message including the information related to performance of the back office service; and
   code to transmit, via the bindings, the second message to the mobile remote computing device over the network via the HTTP protocol.

12. The non-transitory computer-readable storage medium of claim 11 wherein the back office service is one of a configuration service, diagnostics service, game history service, accounting service, or validation service.

13. The non-transitory computer-readable storage medium of claim 11, wherein the wagering game machine has a Uniform Resource Locator (URL) associated with the mobile remote computing device, and wherein the URL is used for transmitting the second message.

14. The non-transitory computer-readable storage medium of claim 11, wherein the first message includes an Hyper Text Markup Language document originating from a browser on the mobile remote computing device.

15. The non-transitory computer-readable storage medium of claim 11, wherein the first message includes a URL and parameters originating from a native application on the mobile remote computing device.

* * * * *